United States Patent Office 3,600,440
Patented Aug. 17, 1971

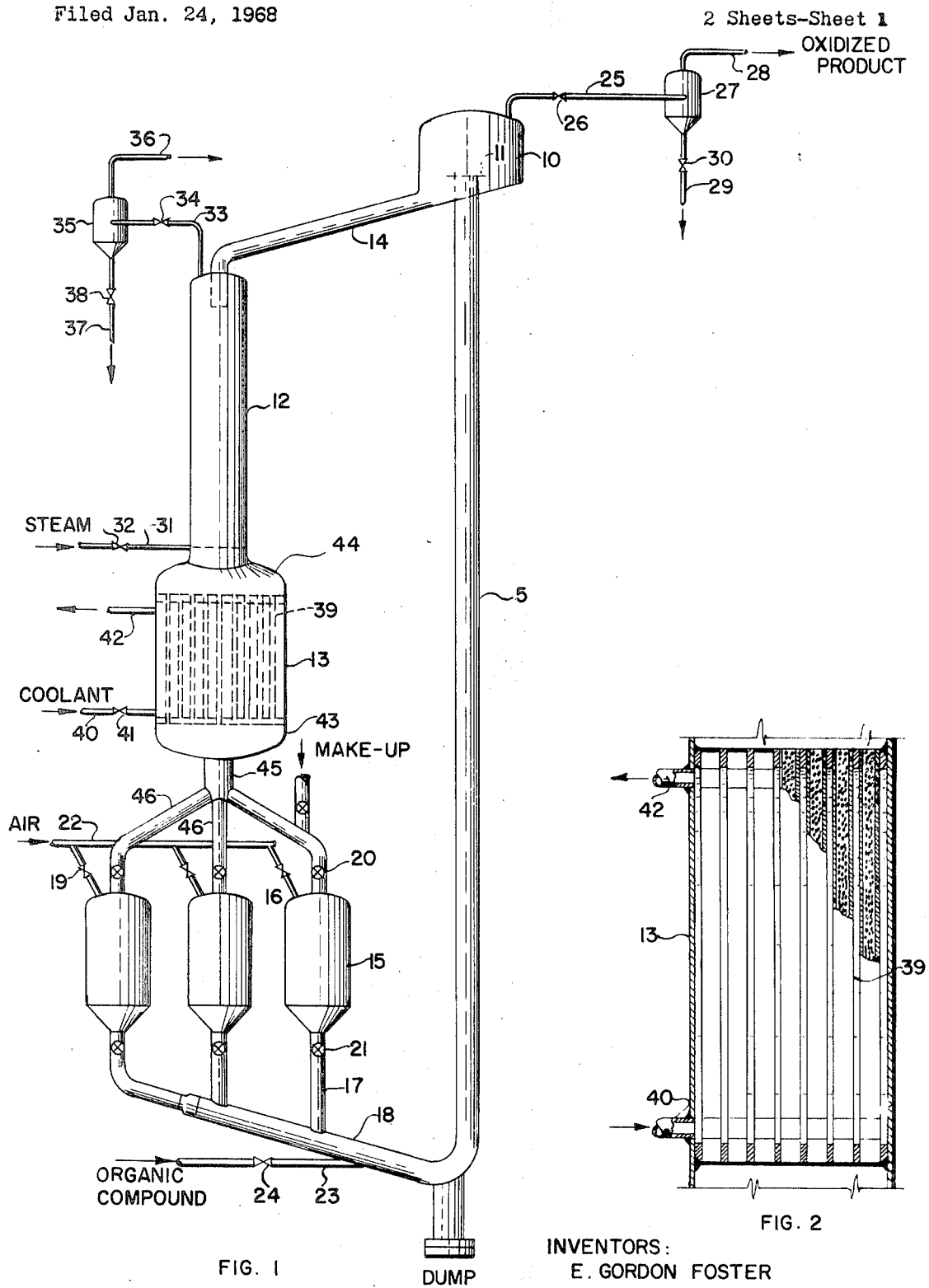

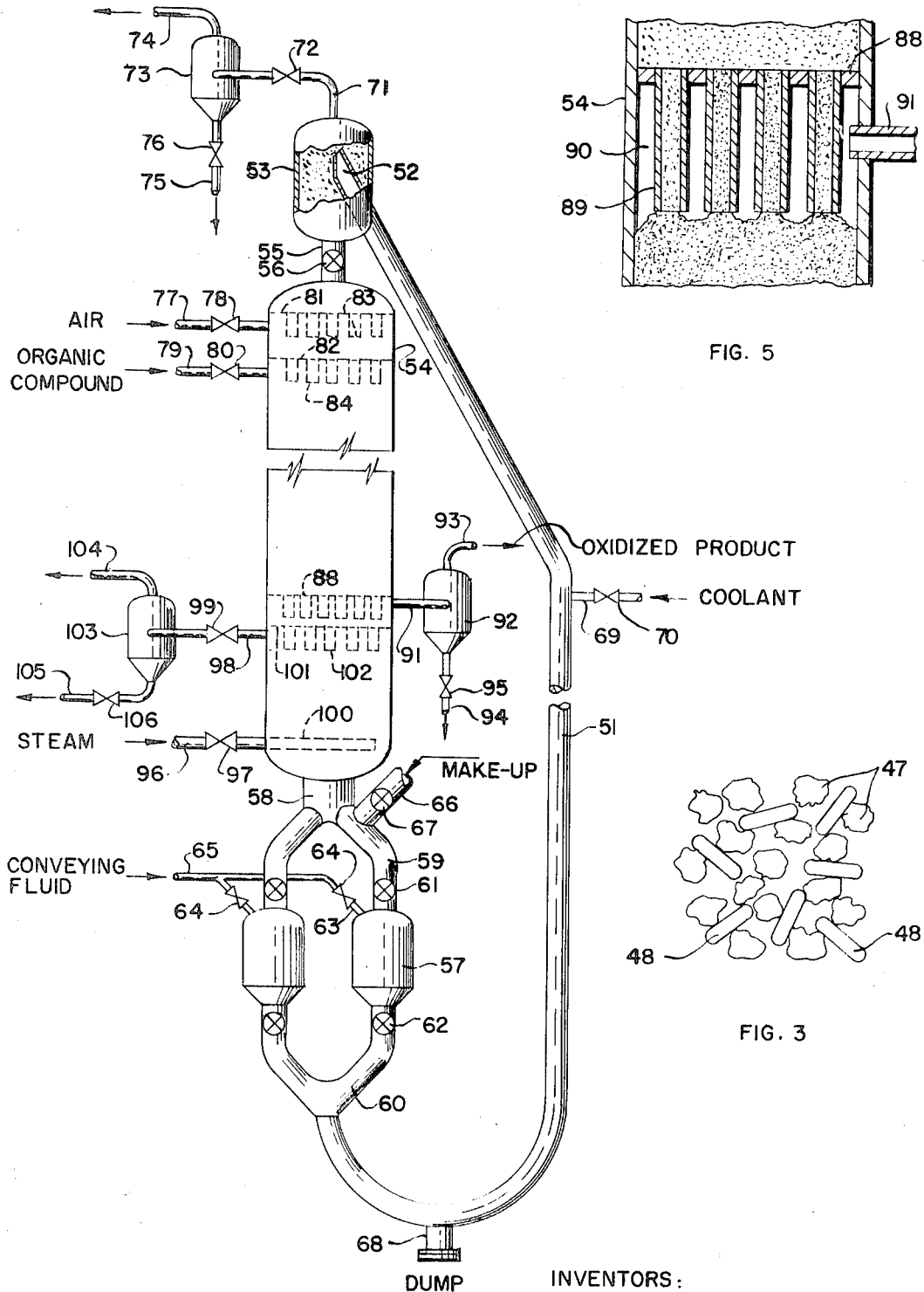

3,600,440
PROCESS FOR CARRYING OUT PARTIAL
OXIDATION OF ORGANIC COMPOUNDS
E. Gordon Foster, Bronxville, N.Y., and Stanley F. Newman, San Francisco, and Robert H. Overcashier, Walnut Creek, Calif., assignors to Shell Oil Company, New York, N.Y.
Filed Jan. 24, 1968, Ser. No. 700,199
Int. Cl. C07c 47/22, 57/04; C07d 1/12, 5/34, 5/10
U.S. Cl. 260—530                                                12 Claims

ABSTRACT OF THE DISCLOSURE

A process for carrying out partial oxidation of organic compounds in the vapor phase by circulating catalytic granular solids continuously through a system which includes vertically elongated up-flow and down-flow paths, one of which passes through an elongated reaction zone. The solids move as a compact bed, at least through the reaction zone, and separate gaseous streams containing respectively an organic compound to be oxidized and oxygen are continuously admitted directly into the moving contact bed within the reaction zone at points spaced apart in the direction of movement of the bed. The streams and contact bed are flowed co-currently through the reaction zone and the reacted mixture is separated from the bed after passage through at least a part of the length of one of the paths.

BACKGROUND OF THE INVENTION

Field of the invention

The invention relates to an improved process for partially oxidizing organic compounds within a compact catalyst bed in the vapor phase and to a moving-bed reactor suitable for carrying out such vapor-phase reactions.

Description of the prior art

Existing methods and equipment for the partial oxidation of organic compounds use either fixed or fluidized beds. The former involves the mixing of streams of the organic compound-containing gas and the oxygen-containing gas prior to their admission to the catalyst-filled reaction zone, which is usually tubular in form, and the flow of the mixture through the fixed bed. This technique has the limitations, known in the art, that the concentration of one or both of the reactants must be kept low enough to be outside of the explosive limit and that it is difficult to control the temperature throughout the bed so as to avoid the danger of having the reaction go out of control, as when hot spots are formed. Therefore, the concentration of one or both of the reactants must be kept quite low. The result is that the concentration of the desired oxidation product in the effluent reaction gas is low; therefore large reactors are required, expensive recovery equipment is necessary to recover the product from the dilute effluent, and costly compressors are required to circulate the large volumes of gas that must be handled.

Very often the oxygen concentration in the initial feed mixture must be held to below about 5 to 15% by volume to insure a non-explosive mixture. But, such low oxygen concentrations lead to dilute products.

Limitations of concentration are encountered in all of the typical vapor-phase oxidation reactions noted above. For example, in the oxidation of benzene to maleic anhydride as practiced commercially in a fixed bed of tubular shape, it is necessary to limit the concentration of benzene in the vapor feed to about 20% by volume, and the concentration of the maleic anhydride in the product gas is only about 1.5% by volume. Thus, 67 volumes of gas must be compressed, circulated, and processed to recover one volume of maleic anhydride.

Because the heat generated by the exothermic oxidation reaction must be carried off by conduction and convection from the reacting stream, there was always the danger that a hot spot would develop within a fixed catalyst bed. This danger was overcome by carrying out the reaction in a fluidized catalyst bed in which the temperature is more uniform and cooling is easier. However, fluidized beds have other drawbacks, principally backmixing, that is, the commingling of the fresh reactants with the fully reacted material, which prevents the optimum control of the degree of the reaction; also, fluidized beds are feasible only when the catalyst consists of small particles and has a reasonable resistance to abrasion.

SUMMARY OF THE INVENTION

It is an object of this invention to provide an improved process for carrying out partial oxidation of organic compounds in the vapor phase.

In summary, the reactant streams are admitted individually into a moving, compact bed of granular contacting material that contains catalyst particles and the reactants and bed are moved co-currently through a confined reaction zone from which the reaction product is discharged at a downstream point. The relative velocity between the reacting gas and the bed is preferably such that the heat of reaction is just absorbed by the maximum acceptable temperature rise of the moving bed.

The invention includes both the use of downward and upward flow through the reaction zone; this may be vertical or inclined. However, in most instances upward flow is preferred because it facilitates the maintenance of the compact bed of contacting material despite appreciable relative flow of the reacting gas without recourse to complicated devices. For example, an ascending bed can be moved upwards by the force of ascending reacting gas and maintained in compact form by restricting the upper end of the riser, as by a thrust plate or a narrow outlet, which impedes but does not stop the discharge of solids. When downward flow of the bed and reactants is used, the bed moves downward by gravity plus the force of the descending gas and a similar restriction may be used at the bottom.

The desired ratio of the quantities of the reactants to the granular contacting material passing a given point in the reaction zone depends principally upon the exothermic heat of the reaction, the specific heat of the bed, and the permissible temperature to which the bed may rise; it is also influenced by other factors, such as the initial temperatures of the feed materials and of the bed prior to receiving the reactants, and the extent to which temperature variations may occur within the bed. In the preferred embodiment, the contacting material is recirculated and is cooled at some point in its circuit, whereby the heat of reaction is removed from the system.

According to an optional feature for reducing temperature variations within the bed, the contacting material contains, dispersed among the catalyst particles, heat carriers, such as small pellets of metal, which may be non-catalytic or inert toward the desired oxidation reaction. They are preferably small and sufficiently numerous to have at least one carrier in close proximity to each catalyst particle. When the surface of any catalyst particle becomes heated to above the average temperature of the bed, heat flows from that particle to a nearby heat carrier, principally by conduction but also by convection due to the relatively moving gas. Because the heat carriers are dispersed throughout the catalyst mass, the distance through which the heat has to travel is small, and no catalyst particle can be heated to a temperature more than a few degrees Fahrenheit above the temperatures of the nearby heat carriers. These carriers also increase the overall specific heat of the bed.

The advantage of this operation is that the moving bed carries heat and facilitates removal of the heat of reaction. Thereby excessive temperatures can be prevented, and the danger of run-away reactions and explosions is obviated. The moving bed combines the desirable features of the fixed bed and of the fluidized bed. Like the former, it results in a minimum of back-mixing, which makes the yield as high as can be achieved with the catalyst being used. Like the latter, control of the temperature is excellent; and the formation of hot spots is prevented. There is also little or no catalyst attrition.

A further advantage is that the ratio of the reactants to the catalyst passing through the reaction zone can be varied over a substantial range. This feature makes it possible to minimize the catalyst recirculation rate by taking full advantage of the maximum allowable temperature change in the reactor consistent with obtaining good reaction yields.

An additional advantage is that it is possible to operate the reactor with a reactant mixture having a composition that is normally within the explosive range, that is, to feed to the reaction zone air and the organic compound in a ratio which produces a flammable mixture. The possibility of an explosion is eliminated by the high heat capacity and low void volume of the compact bed of granular material, which will cool off the reacting mixture before the reaction can run away and generate enough heat to cause an explosion. By feeding a more concentrated feed mixture to the catalyst bed, the productivity of the apparatus of a given size is increased. Also, the product can be recovered more easily because there is less diluent in the reactor effluent.

BRIEF DESCRIPTION OF THE DRAWING

FIG. 1 is an elevation view of one embodiment of the reactor, for carrying out the reaction in an ascending compact bed;

FIG. 2 is a vertical sectional view showing details of the cooler;

FIG. 3 is an enlarged diagrammatic view of a part of a compact bed having heat carriers dispersed among the catalyst particles;

FIG. 4 is an elevational view of an alternate embodiment of the reactor for carrying out the reaction in a descending compact bed; and FIG. 5 is a vertical sectional view in detail of a portion of FIG. 4.

DESCRIPTION OF THE PREFERRED EMBODIMENTS

Referring to FIGS. 1 and 2, the reactor comprises, as its principal components, a riser shell 5, e.g., of tubular construction; a separator chamber 10 at the top, connected to receive the total discharge from the riser shell, the upper part of which projects into the chamber; a thrust plate 11 mounted within the chamber in spaced relation to the end of the riser shell to provide a restricted outlet that impedes but does not stop the upward flow of solids; a down-flow shell including sections 12, 13, the former being supplied with solids from the separator chamber through a downwardly inclined duct 14, and the latter by gravity from the section 12; and one or more lift pots 15,, e.g., three connected in parallel to receive solids from the section 13 by gravity flow and having inlets 16 for receiving a conveying fluid under pressure and outlet 17 that discharge into a downwardly inclined manifold 18 which discharges into the bottom of the riser shell 5.

Although a cylindrical riser shell 5 is shown, it will be understood that this shell need not be of uniform cross-section throughout its length, but may have special shapes for facilitating the upflow of the solids as a compact bed. This shell constitutes the reaction zone through which the granular solids, selected to have the desired catalytic properties, ascend as a compact bed under the influence of the conveying fluid which is admitted at 16 at a rate determined by valves 19. Various types of lift-pot means are known per se and the invention is not restricted to any particular type. Thus, a mechanical means for forcing the solids to flow may be used. In the embodiment shown for purposes of illustration, three pots 15 are provided, each having an inlet valve 20 for isolating it from the down-flow shell section 13 and a valve 21 in its outlet for isolating it from the manifold 18. One lift pot is filled with solids from above while isolated from the manifold while another is being pressurized with gas with both its valves 20 and 21 closed, and the third is discharging into the manifold 18 with its valve 20 closed. In this manner an essentially continuous, steady flow of solids through the shell 5 can be maintained although each lift pot operates cyclically. The several valves 16, 20, and 21 can be motor valves, controlled by a suitable programmer which, being well known per se, is not shown.

Preferably one of the reactant streams, e.g., air under pressure, is supplied to the inlets 16 from a supply manifold 22, and the other reactant, such as propylene, is admitted under pressure through an inlet duct 23 at a rate controlled by a valve 24. Due to the force exerted by the thrust plate 11, the catalyst moves up through the shell 5 as a compact bed, i.e., as a bed having a bulk density that is substantially the same as that of the granular catalyst at rest. It thereby has a low void volume. The reacting gaseous mixture flows upwards past the bed granules, flowing through the interstices thereof, with a relative velocity of about 2 to 20 ft. per sec.

In the example here considered, propylene is catalytically oxidized to acrolein and some by-products. The heat of reaction is absorbed by the catalyst bed, which rises in temperature by an amount depending on the heat of reaction, the amount of the reaction, and the ratio of the reactants to the catalyst. It will be understood that the concentrations of the reactants in the gaseous mixture can be controlled by including a regulated amount of a gaseous diluent with one or both of the feed streams admitted at 22 and 23. Thus, nitrogen can be added to the air stream and/or propane or ethane can be added to the propylene.

The reacted gaseous mixture is separated from the catalyst in the chamber 10 and is discharged through an effluent pipe 25 and valve 26 together with some catalyst fines, which are separated in a cyclone 27. Clean reacted gas is discharged at 28 and catalyst fines are drawn off, e.g., periodically, through an outlet 29 and valve 30.

The section 12 of the down-flow shell is a purge chamber to which a purge fluid, such as steam, is admitted at 31 via a valve 32 to a lower level of the chamber to flow countercurrently to the descending, compact bed of catalyst. The purge fluid, together with purged fluid and, usually, some entrained catalyst fines, is discharged at the top of the chamber through a pipe 33 and a valve 34. When catalyst fines are entrained, they may be separated in a cyclone 35, from which the purge fluid flows off at 36 and the catalyst fines at 37 via a valve 38.

The section 13 is a cooler, wherein the purged catalyst is cooled by any suitable means. In the embodiment shown, the catalyst moves as a compact bed downwards in contact with tubes 39 through which a coolant is flowed, being admitted through an inlet 40 and a valve 41 and discharged through an outlet 42. As appears in FIG. 2, the tubes 39 are in communication at their ends with the outlet and inlet manifolds 43 and 44 respectively, which are situated in section 13 as illustrated in FIG. 1 so as not to interfere with the downward flow of the catalyst. The bottom of the cooler is connected to a central discharge conduit 45 having branches 46 which lead to the lift pots 15.

The degree of cooling is controlled, as by regulating the valve 41 and/or the temperature of the cooling fluid, to abstract so much of the heat of reaction as is not otherwise removed, as by radiation or to preheat the feeds. The temperature of the catalyst discharged through the conduit 45 to the lift pots is usually of the order of approximately 325 to 500° C., being high enough to permit the oxidation reaction to proceed in the lower part of the shell 5.

Temperature variations in the bed can be further reduced by the optional expedient of dispersing heat carriers throughout the catalyst particles. Referring to FIG. 3, the bed includes catalyst particles 47 interspersed with heat carriers, e.g., in the form of small metallic pellets 48. The pellets preferably have minimum diameters between about one-fourth and five times the mean diameters of the catalyst particles and are present in amount to cause each catalyst particle to lie near a heat carrier, e.g., from 0.3 to 4.0 volumes of heat carriers for each volume of catalyst.

The heat carriers absorb heat by conduction and convection from the catalyst particles when the latter rise in temperature due to the reaction occurring thereon, thereby reducing the tendency toward the formation of hot spots. The carriers also usually increase the heat capacity of the granular bed. The surface of a catalyst particle can become hot due to reaction at the surface even though the inside of the particle is relatively cool. This is caused by low thermal conductivity of many catalysts. Metallic particles have a high thermal conductivity and therefore make use of their total heat capacity more rapidly.

FIGS. 4 and 5 show an alternate embodiment in which the reaction zone is in the down-flow part of the system. The reactor includes a riser 51 which may have a restricted outlet 52 through which vapor and granular solids are discharged into a knock-out pot or separator 53 so as to maintain a compact bed within the riser, although in this embodiment it is not essential that the bed move compactly in the riser; a down-flow shell 54 connected to the bottom of the pot 53 by a duct 55 to receive solids by gravity flow as regulated by a valve or flow controller 56; and lift pots 57 connected in parallel to receive solids by gravity flow from the shell 54 via a duct 58 and branch ducts 59 and discharging through ducts 60 to the bottom of the riser 51. The ducts 59 and 60 have shut-off valves 61 and 62, respectively, for the admission and discharge of solids to and from the pots and have inlets 63, individually controlled by valves 64, for the admission of a conveying fluid under pressure from a manifold 65. This fluid may be of any suitable composition, such as steam, air, a mixture of steam and air, or steam and deionized water. Any desired number of lift pots 57 may be provided for cyclic operation as described for the first embodiment; continuous engagement pots or mechanical lift devices may be used, and the catalyst solids can be raised from the bottom of the shell 54 to the top by any means. A branch conduit 66 with a normally closed valve 67 is used to charge granular catalyst to the system, and catalyst can be removed by removing the cover plate on a flanged nipple 68 at the lowest point.

The riser 51 may have a branch pipe 69 through which a coolant, such as deionized water, is injected for direct contact with the ascending granules and vaporization. However, other liquid coolants may be used and other cooling arrangements may be used. The degree of cooling is controlled, as by regulating the rate of flow of liquid coolant by a valve 70. The conveying fluid and vaporized coolant, if any, are separated from the granular catalyst in the pot 53 and discharged via a pipe 71 and a pressure-reducing valve 72; if catalyst fines are entrained in this gaseous stream, they are separated in a cyclone 73, from which the clean gas is discharged at 74 and the solids are drawn off at 75, either continuously or intermittently under control of a valve 76.

The upper part of the shell 54 encloses the reaction zone, through which the solids flow by gravity as a compact bed. One of the reactant streams, e.g., air, is admitted near the top through a supply pipe 77 and a valve 78, and the other reactant stream, e.g., propylene, is admitted at a lower level through a supply pipe 79 and a valve 80. Both streams are fed in gaseous form and may be preheated and/or contain diluents as previously described. These streams are distributed throughout the bed by any suitable means, such as spargers. The distributing arrangement shown includes, for each stream, a horizontal plate 81 or 82 having a plurality of holes to which tubes 83 or 84 are fitted. The granules move downwards through these tubes onto the compact bed below, leaving a free space immediately beneath the plates for distribution of the gas. The reacted gaseous mixture is discharged at the bottom of the reaction zone by any suitable draw-off means, such as a horizontal plate 88 having tubes 89 depending therefrom, as shown in FIG. 5. This provides a free space 90 immediately beneath the plate into which the gaseous mixture can rise from the bed and from which it can enter a discharge pipe 91. Normally this stream will contain entrained catalyst fines, which are separated in a cyclone 92. The clean product stream containing the oxidized organic compound is discharged at 93, and the catalyst fines are discharged continuously or intermittently at 94 through a valve 95.

The lower part of the shell 54 is a purge chamber, to which a purge fluid, such as steam, is admitted at the bottom through a pipe 96 and a valve 97 for upward flow countercurrently to the descending compact catalyst bed. The purge fluid, together with purged fluid and, usually, entrained catalyst fines, is discharged at the top of the purge chamber through a pipe 98 and a valve 99. Suitable distributing and draw-off devices are provided. For example, the pipe 96 can be connected to a perforated sparger 100, and the pipe 98 can be connected to the chamber beneath a plate 101 having depending tubes 102, constructed similarly to the arrangement of FIG. 5. When catalyst fines are entrained, they are separated in a cyclone 103 from which the purge fluid is discharged at 104 and the catalyst fines at 105 through a valve 106.

In operation, the reactant streams, in gaseous form and preferably preheated, together with diluents as previously described for the first embodiment, are admitted at 77 and 79 and become intimately mixed within the compact bed; the resulting mixture flows downwardly through the reaction zone co-currently with the descending compact bed of catalyst at the same, a lesser, or a greater rate of flow than the bed. Because it is not necessary for the reacting gases to lift the bed against gravity, there is wide choice in the relative velocity between gas and bed, making it easy to utilize the full heat capacity of the bed for absorbing the heat of reaction. However, a relative velocity between bed and gas of at least 2 ft. per sec. promotes mixing of the reactants and equalizes bed temperatures by convection. The bed granules are supplied from the pot 53 at a temperature low enough to enable the bed to carry off the necessary amount of heat to prevent the temperature from rising above a safe or other desired level. As in the first embodiment, the ratio of the reactants to the bed passing a given point in the reactor zone can be varied to exert the desired control. By introducing the two reactant streams into the moving bed at different points, the reactants are never in contact except within the bed. Because of the heat capacity of the bed (and the effect of the large surface area on suppressing explosions), the danger of a run-away thermal reaction is avoided.

Among the oxidation reactions which can be performed by the invention are the oxidation of (a) propylene to acrolein, using copper, copper oxide, or bismuth molybdate as a catalyst, (b) acrolein to acrylic acid, using bismuth molybdate as a catalyst. (c) naphthalene to phthalic anhydride, using vanadium pentoxide as a catalyst, (d) benzene to maleic anhydride, using vanadium pentoxide as a catalyst, and (e) ethylene to ethylene oxide, using silver as a catalyst.

Various methods of carrying out the concepts of this invention may become apparent to one skilled in the art, and it is to be understood that such modifications fall within the spirit and scope of the appended claims.

We claim as our invention:

1. The process of partially oxidizing an organic compound, in the vapor phase, which comprises:
   (a) conveying catalytic, granular solids through a circular flow system which includes a vertically elongated up-flow segment and a vertically elongated down-flow segment, one of which segments is an oxidation reaction zone and the other of which segments is a means for recycle of the solids to said reaction zone, in which system the solids move as a compact bed having a bulk density substantially the same as that of the granular solids at rest, at least during passage of said bed through the reactor segment of said system;
   (b) continuously admitting, to the initial portion of the reactor segment, at separate locations spaced apart in the direction of compact bed movement, separate gaseous streams containing respectively the organic compound and oxygen;
   (c) passing the admitted gases and moving, compact bed co-currently through the remaining portion of the reactor-segment;
   (d) separating the resulting partially oxidized, reactor-segment effluent gases from the moving compact bed; and
   (e) cooling the separated catalytic, granular solids and subsequently returning the cooled solids to the reactor segment through said recycle means.

2. The process in accordance with claim 1 wherein the catalytic, granular solids contain dispersed among them a multitude of heat carriers that are catalytically inert to the oxidation reaction.

3. The process in accordance with claim 2 wherein the inert heat carriers are metallic pellets having diameters between about one-fourth to about five times the diameters of the catalyst solids.

4. The process in accordance with claim 1 wherein the separation of the partially oxidized reactor-segment effluent gases from the bed includes the steps of:
   (a) purging the moving, compact bed by admitting steam into the bed, down-stream from the reactor-segment; and
   (b) discharging the admitted steam together with effluent gases from the bed.

5. The process in accordance with claim 1 wherein the admitted and reacting gases move through the oxidation reactor-segment at a velocity between about one-half and about three times the velocity of the moving, compact bed.

6. The process in accordance with claim 1 wherein:
   (a) the oxidation of the organic compound is effected in the up-flow segment wherein the catalytic granular solids are conveyed upward as a compact bed by the gaseous reactants admitted under pressure at the bottom of the up-flow segment.

7. The process in accordance with claim 6 wherein the gaseous reactants move through the reactor-segment with an upward velocity, relative to the ascending bed, of at least two feet per second.

8. The process in accordance with claim 6 wherein:
   (a) the reaction mixture is separated from the moving, compact bed at the top of the up-flow segment;
   (b) the catalytic granular solids thereafter pass downward, by gravity flow, into a purge zone in which they are intimately contacted with steam; and
   (c) the solids pass downward, by gravity, from the purge zone into a cooling zone, being cooled in the latter.

9. The process in accordance with claim 1 wherein the oxidation reaction takes place in the down-flow segment in which the solids move downward as a compact bed through the segment by gravity flow.

10. The process in accordance with claim 9 wherein deionized water is injected into the upflow segment to reduce the temperature of the circulating catalytic, granular solids therein by direct contact cooling.

11. The process in accordance with claim 1 wherein the organic compound is propylene and the catalytic, granular solid is selected from the group consisting of copper, copper oxide, and bismuth molybdate.

12. The process in accordance with claim 1 wherein the organic compound is acrolein and the catalytic, granular solid is bismuth molybdate.

References Cited

UNITED STATES PATENTS 2,526,689  10/1950  Rollman _____ 260—346.4

FOREIGN PATENTS 855,091  11/1960  Great Britain _____ 260—348.5

NORMA S. MILESTONE, Primary Examiner

U.S. Cl. X.R.

23—288; 260—346.4, 346.8, 348.5, 604, 687